United States Patent
Patruni et al.

(10) Patent No.: US 10,680,472 B1
(45) Date of Patent: Jun. 9, 2020

(54) STATOR HAVING SKEWED MOUNTING EARS

(71) Applicant: GM Global Technology Operations LLC, Detroit, MI (US)

(72) Inventors: Pavan Kumar Patruni, Karnatka (IN); Song He, Troy, MI (US); Edward L. Kaiser, Orion, MI (US); Mithun Sunny, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 16/214,795

(22) Filed: Dec. 10, 2018

(51) Int. Cl.
*H02K 1/06* (2006.01)
*H02K 1/16* (2006.01)
*H02K 1/18* (2006.01)

(52) U.S. Cl.
CPC ............... *H02K 1/16* (2013.01); *H02K 1/185* (2013.01)

(58) Field of Classification Search
CPC ............ H02K 1/185; H02K 1/18; H02K 1/16; H02K 1/28
USPC .............................................. 310/89, 216.011
See application file for complete search history.

(56) References Cited

U.S. PATENT DOCUMENTS

| | | | | |
|---|---|---|---|---|
| 3,466,518 A * | 9/1969 | Aylikci | ................... | H02K 37/04 318/685 |
| RE26,788 E * | 2/1970 | Hull | ..................... | H02K 15/024 310/216.065 |
| 5,799,387 A * | 9/1998 | Neuenschwander | .. | B21D 28/02 29/598 |
| 5,929,545 A * | 7/1999 | Fargo | ........................ | H02K 5/15 310/89 |
| 7,960,881 B2 * | 6/2011 | Burton | ..................... | H02K 5/10 310/88 |
| 8,415,846 B2 * | 4/2013 | Best | ......................... | H02K 5/10 310/43 |
| 2001/0011853 A1 * | 8/2001 | Gatley | ..................... | H02K 5/04 310/254.1 |
| 2006/0284511 A1 * | 12/2006 | Evon | ........................ | H02K 1/20 310/216.004 |
| 2011/0298331 A1 * | 12/2011 | Kaiser | .................... | H02K 1/185 310/216.129 |

* cited by examiner

*Primary Examiner* — Thanh Lam
(74) *Attorney, Agent, or Firm* — Quinn IP Law

(57) ABSTRACT

A stator for an electromagnetic machine includes a first lamination stack defining a first cavity therein and having a central longitudinal axis. The first lamination stack includes a first plurality of mounting ears disposed opposite the first cavity and each spaced apart from one another about the central longitudinal axis. The stator further includes a second lamination stack abutting the first lamination stack and defining a second cavity therein aligned with the first cavity along the central longitudinal axis. The second lamination stack includes a second plurality of mounting ears disposed opposite the second cavity and each spaced apart from the first plurality of mounting ears and from one another about the central longitudinal axis. An electromagnetic machine including the stator and a device including the electromagnetic machine are also described.

20 Claims, 4 Drawing Sheets

STATOR HAVING SKEWED MOUNTING EARS

INTRODUCTION

The disclosure relates to a stator, an electromagnetic machine including the stator, and a device including the electromagnetic machine.

Electromagnetic machines such as electric motors, generators, and traction motors are useful for converting energy from one form to another. Such electromagnetic machines often include an element rotatable about an axis of rotation. The rotatable element, i.e., the rotor, may be coaxial with a static element, i.e., a stator, and energy may be converted via relative rotation between the rotor and stator.

SUMMARY

A stator for an electromagnetic machine includes a first lamination stack defining a first cavity therein and having a central longitudinal axis. The first lamination stack includes a first plurality of mounting ears disposed opposite the first cavity and each spaced apart from one another about the central longitudinal axis. The stator further includes a second lamination stack abutting the first lamination stack and defining a second cavity therein aligned with the first cavity along the central longitudinal axis. The second lamination stack includes a second plurality of mounting ears disposed opposite the second cavity and each spaced apart from the first plurality of mounting ears and from one another about the central longitudinal axis.

The first lamination stack may be rotated with respect to the second lamination stack about the central longitudinal axis. Further, the first plurality of mounting ears may not contact the second plurality of mounting ears.

In one aspect, the first plurality of mounting ears may be spaced apart from one another By 120 angular degrees. Further, the second plurality of mounting ears may be spaced apart from one another by 120 angular degrees and may each be spaced apart from a respective one of the first plurality of mounting ears by 60 annular degrees.

The first lamination stack may have a first height along the central longitudinal axis and the second lamination stack may have a second height along the central longitudinal axis that is equal to the first height.

The first lamination stack may also have a first external surface spaced opposite the first cavity, and the first plurality of mounting ears may extend from the first external surface away from the first cavity.

In another aspect, the first lamination stack may be welded to the second lamination stack on the first external surface. In a further aspect, the first lamination stack may have an interface surface and may be adhered to the second lamination stack at the interface surface.

Each of the first plurality of mounting ears may be configured to receive a respective one of a first plurality of fasteners. Each of the second plurality of mounting ears may be configured to receive a respective one of a second plurality of fasteners that are different from the first plurality of fasteners.

In one aspect, the stator may include at least three of the first plurality of mounting ears and at least three of the second plurality of mounting ears.

In an additional aspect, the stator may further include a third lamination stack abutting the second lamination stack and defining a third cavity therein aligned with the first cavity and the second cavity about the central longitudinal axis. The third lamination stack may include a third plurality of mounting ears disposed opposite the third cavity and each spaced apart from the second plurality of mounting ears and from one another about the central longitudinal axis.

An electromagnetic machine includes a motor housing defining a chamber therein and a stator disposed within the chamber and fastened to the motor housing. The stator includes a first lamination stack defining a first cavity therein and having a central longitudinal axis. The first lamination stack includes a first plurality of mounting ears disposed opposite the first cavity and each spaced apart from one another about the central longitudinal axis. The stator also includes a second lamination stack abutting the first lamination stack and defining a second cavity therein aligned with the first cavity along the central longitudinal axis. The second lamination stack includes a second plurality of mounting ears disposed opposite the second cavity and each spaced apart from the first plurality of mounting ears and from one another about the central longitudinal axis. The electromagnetic machine further includes a first plurality of fasteners each disposed within a respective one of the first plurality of mounting ears to thereby fasten the first lamination stack to the motor housing. In addition, the electromagnetic machine includes a second plurality of fasteners each disposed within a respective one of the second plurality of mounting ears to thereby fasten the second lamination stack to the motor housing.

The electromagnetic machine may further include a plurality of bosses disposed on the motor housing and each configured for receiving a respective one of the second plurality of fasteners.

In one aspect, each of the first plurality of fasteners may have a first length and each of the second plurality of fasteners may have a second length that is equal to the first length.

In another aspect, each of the second plurality of fasteners may be longer than each of the first plurality of fasteners.

A device includes a driven component and an electromagnetic machine coupled to the driven component. The electromagnetic machine includes a motor housing defining a chamber therein and a stator disposed within the chamber and fastened to the motor housing. The stator includes a first lamination stack defining a first cavity therein and having a central longitudinal axis. The first lamination stack includes a first plurality of mounting ears disposed opposite the first cavity and each spaced apart from one another about the central longitudinal axis. The stator also includes a second lamination stack abutting the first lamination stack and defining a second cavity therein aligned with the first cavity along the central longitudinal axis. The second lamination stack includes a second plurality of mounting ears disposed opposite the second cavity and each spaced apart from the first plurality of mounting ears and from one another about the central longitudinal axis. The device also includes an output member disposed within the first cavity and the second cavity and configured for driving the driven component.

In one aspect, the first lamination stack may be rotated with respect to the second lamination stack about the central longitudinal axis such that the first plurality of mounting ears do not contact the second plurality of mounting ears.

In another aspect, the stator may further include a third lamination stack abutting the second lamination stack and defining a third cavity therein aligned with the first cavity and the second cavity about the central longitudinal axis. The third lamination stack may include a third plurality of mounting ears disposed opposite the third cavity and each spaced apart from the second plurality of mounting ears and from one another such that the third lamination stack is rotated with respect to the second lamination stack about the central longitudinal axis so that the third plurality of mounting ears do not contact the second plurality of mounting ears.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
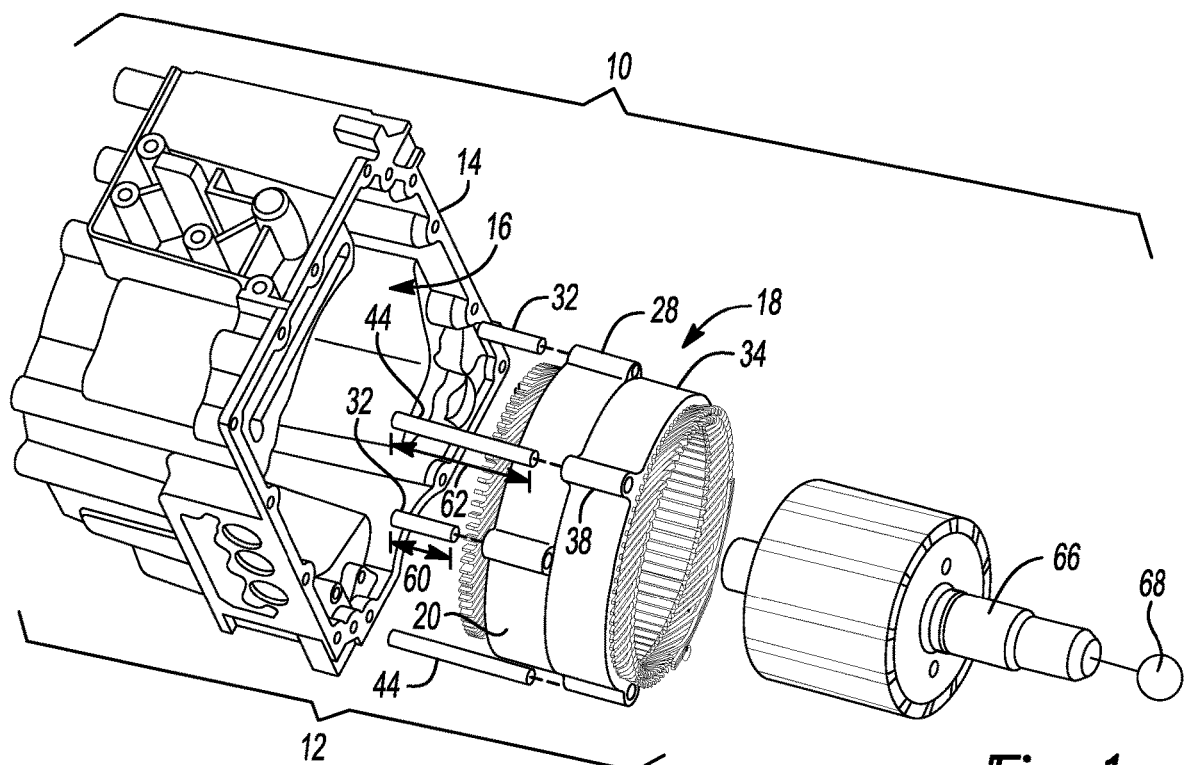
FIG. 1 is a schematic illustration of an exploded perspective view of a device including an electromagnetic machine having a motor housing and a stator.

Referring to the Figures, wherein like reference numerals refer to like elements, a device 10 including an electromagnetic machine 12 is shown generally in FIG. 1. The device 10 and electromagnetic machine 12 may be useful for applications requiring excellent efficiency and minimal noise, vibration, and harshness during operation. In particular, the electromagnetic machine 12 may have excellent stiffness and stability and therefore may not suffer from low-frequency whine and/or efficiency losses during operation. In addition, the electromagnetic machine 12 and device 10 may be economical in terms of manufacturing time and cost and may be scalable to mass production manufacturing operations.

Accordingly, the device 10 and electromagnetic machine 12 may be useful for vehicular applications such as, but not limited to, automobiles, buses, forklifts, motorcycles, bicycles, trains, trams, trolleys, spacecraft, airplanes, farming equipment, earthmoving or construction equipment, cranes, tanks and transporters, boats, and the like. Alternatively, the device 10 and electromagnetic machine 12 may be useful for non-vehicular applications such as stationary power generation, residential appliances, portable power generation, electronics, computers, tools, and the like. More specifically, by way of a non-limiting example, the device 10 and electromagnetic machine 12 may be useful for electric traction motor applications for non-autonomous, autonomous, or semi-autonomous vehicle applications. That is, the device 10 may be a vehicle and the electromagnetic machine 12 may be an electric motor.

More specifically, as described with reference to FIG. 1, the electromagnetic machine 12 includes a motor housing 14 defining a chamber 16 therein, and a stator 18 disposed within the chamber 16 and fastened to the motor housing 14. The motor housing 14 may be configured for supporting and protecting components of the electromagnetic machine 12 and may be formed from a comparatively rigid, formable, and lightweight material such as steel or aluminum. The motor housing 14 may have a generally square or rectangular shape and the chamber 16 may be configured for receiving the stator 18.

Figure 2:
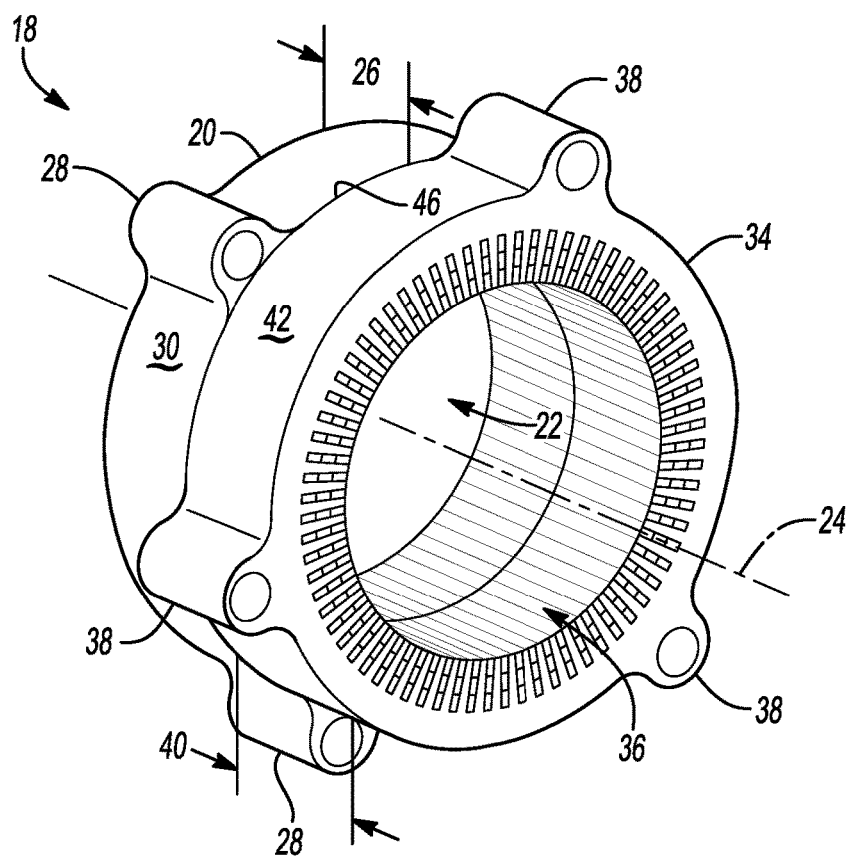
FIG. 2 is a schematic illustration of a perspective view of the stator of FIG. 1.

Referring now to FIG. 2, the stator 18 for the electromagnetic machine 12 includes a first lamination stack 20 defining a first cavity 22 therein and having a central longitudinal axis 24. The first lamination stack 20 may be formed from a plurality of circular and concentric individual laminations (not shown) formed from, for example, lamination steel and may have a cylindrical shape. In addition, the first lamination stack 20 may have a first height 26 along the central longitudinal axis 24.

Further, the first lamination stack 20 includes a first plurality of mounting ears 28 disposed opposite the first cavity 22 and each spaced apart from one another about the central longitudinal axis 24. More specifically, the first lamination stack 20 may have a first external surface 30 spaced opposite the first cavity 22, and the first plurality of mounting ears 28 may extend from the first external surface 30 away from the first cavity 22. Each of the first plurality of mounting ears 28 may be configured for receiving a respective one of a first plurality of fasteners 32 (FIG. 1) to thereby fasten the first lamination stack 20 to the motor housing 14, as set forth in more detail below. That is, each of the first plurality of mounting ears 28 may be shaped as a protrusion or bump-out from the first external surface 30 and may be arranged to receive the respective fastener 32, e.g., a bolt, so as to secure the stator 18 within the chamber 16 during assembly of the electromagnetic machine 12. In addition, the first plurality of mounting ears 28 may carry a torque during operation of the electromagnetic machine 12.

The stator 18 may include any number of the first plurality of mounting ears 28. In one embodiment, the stator 18 may include at least three of the first plurality of mounting ears 28 so as to stably attach the stator 18 to the motor housing 14 and minimize eccentric rotation of the stator 18 during operation. For example, as shown in FIG. 2, the first lamination stack 20 may include three of the first plurality of mounting ears 28. Alternatively, although not shown, the stator 18 may include four or more of the first plurality of mounting ears 28.

The first plurality of mounting ears 28 may be spaced apart from one another by a suitable number of annular degrees. In one non-limiting example, the first plurality of mounting ears 28 may be spaced apart from one another by 120 angular degrees. Alternatively, although not shown, the first plurality of mounting ears 28 may be spaced apart from one another by 90 angular degrees or by 72 angular degrees.

Referring again to FIG. 2, the stator 18 includes a second lamination stack 34 abutting the first lamination stack 20 and defining a second cavity 36 therein aligned with the first cavity 22 along the central longitudinal axis 24. The second lamination stack 34 may also be formed from a plurality of circular and concentric individual laminations (not shown) formed from, for example, lamination steel and may also have a cylindrical shape. In other words, the stator 18 may be split into multiple lamination stacks 20, 34 that may be rotated or skewed with respect to one another. Although set forth in more detail below, such rotation or skewing may multiply a number of mounting ears 28, 38 for attaching the stator 18 to the motor housing 14, which may increase stiffness and decrease noise, vibration, and harshness without adding stator mass and without changing a design or configuration of individual laminations.

The second lamination stack 34 may have a second height 40 (FIG. 2) along the central longitudinal axis 24 that is equal to the first height 26. That is, the first lamination stack 20 and the second lamination stack 34 may be similarly sized. Alternatively, although not shown, the first height 26 may be greater than or less than the second height 40 such that the first lamination stack 20 and the second lamination stack 34 have different heights 26, 40. The first height 26 and the second height 40 may be selected and optimized to minimize noise, vibration, and harshness of the stator 18 during operation of the electromagnetic machine 12.

Further, the second lamination stack 34 includes a second plurality of mounting ears 38 disposed opposite the second cavity 36 and each spaced apart from the first plurality of mounting ears 28 and from one another about the central longitudinal axis 24. That is, as best shown in FIG. 2, the first lamination stack 20 may be rotated with respect to the second lamination stack 34 about the central longitudinal axis 24. Stated differently, the first lamination stack 20 may be shifted or skewed or biased with respect to the second lamination stack 34 about the central longitudinal axis 24, as set forth in more detail below.

More specifically, as described with continued reference to FIG. 2, the second lamination stack 34 may have a second external surface 42 spaced opposite the second cavity 36, and the second plurality of mounting ears 38 may extend from the second external surface 42 away from the second cavity 36. Each of the second plurality of mounting ears 38 may be configured for receiving a respective one of a second plurality of fasteners 44 (FIG. 1) that are different from the first plurality of fasteners 32 (FIG. 1) to thereby fasten the second lamination stack 34 to the motor housing 14.

That is, one of the first plurality of fasteners 32 may not extend through both a respective one of the first plurality of mounting ears 28 and a respective one of the second plurality of mounting ears 38. Similarly, one of the second plurality of fasteners 44 may not extend through both a respective one of the first plurality of mounting ears 28 and a respective one of the second plurality of mounting ears 38. Instead, each of the first plurality of mounting ears 28 may solely be configured to receive a respective one of the first plurality of fasteners 32. Likewise, each of the second plurality of mounting ears 38 may solely be configured to receive a respective one of the second plurality of fasteners 44.

Referring again to FIG. 2, each of the second plurality of mounting ears 38 may be shaped as a protrusion or bump-out from the second external surface 42 and may be arranged to receive the respective fastener 44, e.g., a bolt, so as to secure the stator 18 within the chamber 16 during assembly of the electromagnetic machine 12. In addition, the second plurality of mounting ears 38 may carry a torque during operation of the electromagnetic machine 12.

The stator 18 may include any number of the second plurality of mounting ears 38. In one embodiment, the stator 18 may include at least three of the second plurality of mounting ears 38 so as to stably attach the stator 18 to the motor housing 14 and minimize eccentric rotation of the stator 18 during operation. For example, as shown in FIG. 2, the first lamination stack 20 may include at least three of the first plurality of mounting ears 28 and the second lamination stack 34 may include three of the second plurality of mounting ears 38. Alternatively, although not shown, the stator 18 may include four or more of the second plurality of mounting ears 38.

The second plurality of mounting ears 38 may be spaced apart from one another by a suitable number of annular degrees. In one non-limiting example, the second plurality of mounting ears 38 may be spaced apart from one another by 120 angular degrees. Alternatively, although not shown, the second plurality of mounting ears 38 may be spaced apart from one another by 90 angular degrees or by 72 angular degrees.

As described with continued reference to FIG. 2, the first lamination stack 20 may be rotated with respect to the second lamination stack 34 about the central longitudinal axis 24 such that the first plurality of mounting ears 28 do not contact the second plurality of mounting ears 38. That is, the first plurality of mounting ears 28 may not touch or abut the second plurality of mounting ears 38 but may instead be shifted annularly with respect to the second plurality of mounting ears 38 about the central longitudinal axis 24. By way of a non-limiting example, the second plurality of mounting ears 38 may be spaced apart from one another by 120 annular degrees and may each be spaced apart from a respective one of the first plurality of mounting ears 28 by 60 annular degrees. Alternatively, although not shown, in another non-limiting example, the second plurality of mounting ears 38 may be spaced apart from one another by 90 annular degrees and may each be spaced apart from a respective one of the first plurality of mounting ears 28 by 45 annular degrees. The number of angular degrees or amount of rotation may be selected and optimized to minimize noise, vibration, and harshness of the stator 18 during operation of the electromagnetic machine 12.

Such rotation or offset of the second plurality of mounting ears 38 with respect to the first plurality of mounting ears 28 may increase a stiffness and stability of the stator 18 and minimize noise, vibration, and harshness of the stator 18 during operation of the electromagnetic machine 12 without adding stator mass or changing a design of individual laminations. That is, such rotation may increase, e.g., at least double or triple, the number of mounting ears 28, 38 of the stator 18. Such increased number of mounting ears 28, 38 may ensure excellent attachment of the stator 18 to the motor housing 14, e.g., via the first plurality of fasteners 32 (FIG. 1) and the second plurality of fasteners 44 (FIG. 2), and may therefore increase stiffness of the stator 18 and stator 18-motor housing 14 connection.

Referring again to FIG. 2, the first lamination stack 20 abuts the second lamination stack 34. In one embodiment, the first lamination stack 20 may be welded to the second lamination stack 34 on the first external surface 30. That is, the first lamination stack 20 and the second lamination stack 34 may be welded together along the first external surface 30 and the second external surface 42, e.g., along an exterior of the stator 18. Alternatively, the first lamination stack 20 may have an interface surface 46 and may be adhered to the second lamination stack 34 at the interface surface 46. For example, an adhesive may be disposed along and sandwiched between adjoining layers of the first lamination stack 20 and second lamination stack 34. That is, the adhesive may be disposed between a top individual lamination steel of the first lamination stack 20 and a bottom individual lamination steel of the second lamination stack 34 to thereby adhere the first lamination stack 20 to the second lamination stack 34. Alternatively, the first lamination stack 20 and the second lamination stack 34 may be formed from self-bonding lamination steel including a curable coating configured for bonding together adjacent laminations. That is, the first lamination stack 20 and the second lamination stack 34 may have interlinks between each adjacent individual lamination.

Figure 4:
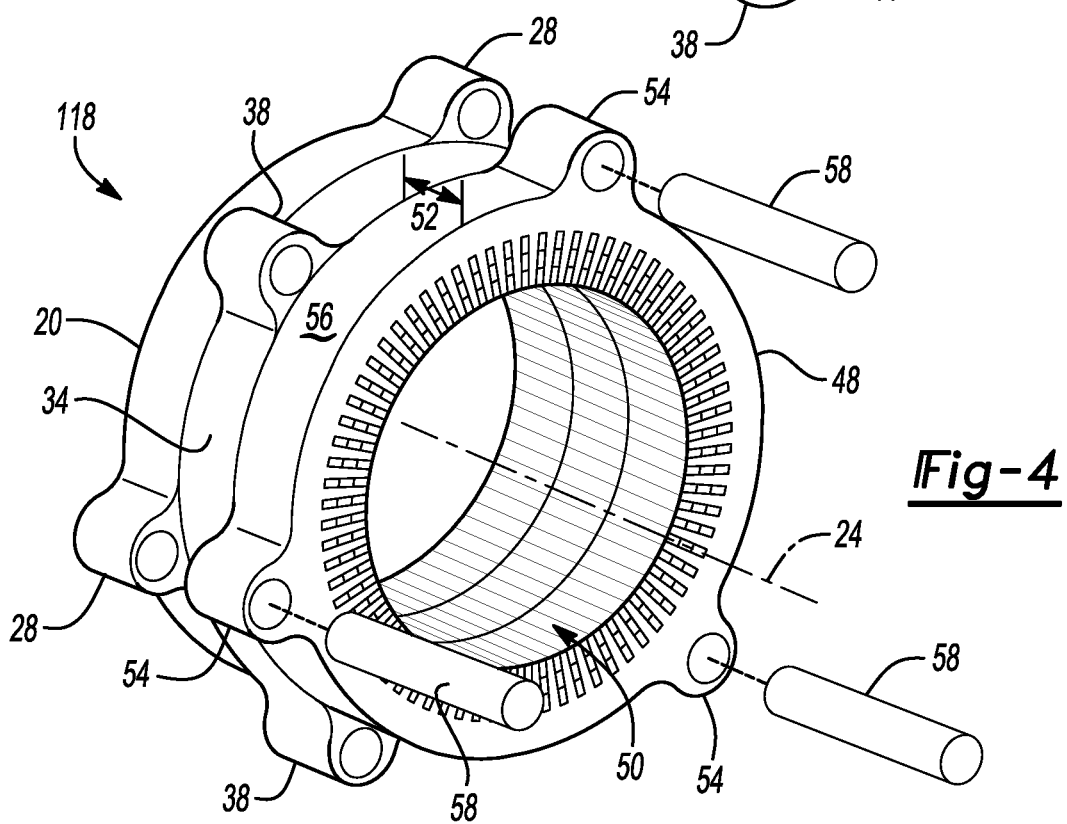
FIG. 4 is a schematic illustration of a perspective view of another embodiment of the stator of FIGS. 1-3.

Referring now to FIG. 4, the stator 118 may include more than two lamination stacks 20, 34. The number of lamination stacks 20, 34 may be selected and optimized to minimize noise, vibration, and harshness of the stator 118 during operation of the electromagnetic machine 12. For example, the stator 118 may include three lamination stacks 20, 34, 48 or four or more lamination stacks (not shown).

In one non-limiting embodiment illustrated in FIG. 4, the stator 118 may include a third lamination stack 48 abutting the second lamination stack 34 and defining a third cavity 50 aligned with the first cavity 22 and the second cavity 36 about the central longitudinal axis 24. The third lamination stack 48 may also be formed from a plurality of circular and concentric individual laminations (not shown) formed from, for example, lamination steel and may have a cylindrical shape.

The third lamination stack 48 may have a third height 52 (FIG. 4) along the central longitudinal axis 24 that is equal to the first height 26 (FIG. 2) and the second height 40 (FIG. 2). That is, the first lamination stack 20, the second lamination stack 34, and the third lamination stack 48 may be similarly sized. Alternatively, although not shown, the first height 26 or the second height 40 may be greater than or less than the third height 52 such that the first lamination stack 20, the second lamination stack 34, or the third lamination stack 48 have different heights 26, 40, 52. The third height 52 may be selected to minimize noise, vibration, and harshness of the stator 118 during operation of the electromagnetic machine 12.

Further, the third lamination stack 48 may include a third plurality of mounting ears 54 disposed opposite the third cavity 50 and each spaced apart from the second plurality of mounting ears 38 and from one another about the central longitudinal axis 24. That is, as best shown in FIG. 4, the third lamination stack 48 may be rotated with respect to the second lamination stack 34 about the central longitudinal axis 24. Stated differently, the third lamination stack 48 may be shifted or skewed or biased with respect to the second lamination stack 34 about the central longitudinal axis 24.

In particular, as described with continued reference to FIG. 4, the third lamination stack 48 may have a third external surface 56 spaced opposite the third cavity 50, and the third plurality of mounting ears 54 may extend from the third external surface 56 away from the third cavity 50. Each of the third plurality of mounting ears 54 may be configured for receiving a respective one of a third plurality of fasteners 58 that are different from the second plurality of fasteners 44 (FIG. 1) to thereby fasten the third lamination stack 48 to the motor housing 14. Stated differently, one of the first plurality of fasteners 32 may not extend through both a respective one of the third plurality of mounting ears 54 and a respective one of the second plurality of mounting ears 38. However, one of the first plurality of fasteners 32 may extend through both a respective one of the third plurality of fasteners 58 and a respective one of the first plurality of fasteners 32.

Referring again to FIG. 4, each of the third plurality of mounting ears 54 may be shaped as a protrusion or bump-out from the third external surface 56 and may be arranged to receive the respective fastener 58, e.g., a bolt, so as to secure the stator 118 within the chamber 16 during assembly of the electromagnetic machine 12. In addition, the third plurality of mounting ears 54 may carry a torque during operation of the electromagnetic machine 12.

The stator 118 may include any number of the third plurality of mounting ears 54. In one embodiment, the stator 118 may include at least three of the third plurality of mounting ears 54 so as to stably attach the stator 118 to the motor housing 14 and minimize eccentric rotation of the stator 118 during operation. That is, as shown in FIG. 4, the first lamination stack 20 may include three of the first plurality of mounting ears 28, the second lamination stack 34 may include three of the second plurality of mounting ears 38, and the third lamination stack 48 may include three of the third plurality of mounting ears 54. Alternatively, although not shown, the stator 118 may include four or more of the third plurality of mounting ears 54.

The third plurality of mounting ears 54 may be spaced apart from one another by a suitable number of annular degrees. In one non-limiting example, the third plurality of mounting ears 54 may be spaced apart from one another by 120 angular degrees. Alternatively, although not shown, the third plurality of mounting ears 54 may be spaced apart from one another by 90 angular degrees or by 72 angular degrees.

As described with continued reference to FIG. 4, the third lamination stack 48 may be rotated with respect to the second lamination stack 34 about the central longitudinal axis 24 such that the third plurality of mounting ears 54 do not contact the second plurality of mounting ears 38. That is, the third plurality of mounting ears 54 may not abut or touch the second plurality of mounting ears 38 but may instead be shifted annularly with respect to the second plurality of mounting ears 38 about the central longitudinal axis 24. By way of a non-limiting example, the third plurality of mounting ears 54 may be spaced apart from one another by 120 annular degrees and may each be spaced apart from a respective one of the second plurality of mounting ears 38 by 60 annular degrees. Alternatively, although not shown, in another non-limiting example, the third plurality of mounting ears 54 may be spaced apart from one another by 90 annular degrees and may each be spaced apart from a respective one of the second plurality of mounting ears 38 by 45 annular degrees.

Such rotation or offset of the third plurality of mounting ears 54 with respect to the second plurality of mounting ears 38 may increase a stiffness and stability of the stator 118 and minimize noise, vibration, and harshness of the stator 118 during operation of the electromagnetic machine 12 without adding stator mass or changing a design of individual laminations. That is, such rotation may in effect increase, e.g., at least double or triple, the number of mounting ears 28, 38, 54 of the stator 118. Such increased number of mounting ears 28, 38, 54 may ensure excellent attachment of the stator 118 to the motor housing 14, e.g., via the first plurality of fasteners 32 (FIG. 1), the second plurality of fasteners 44 (FIG. 1), and the third plurality of fasteners 58 (FIG. 4), and may therefore increase stiffness of the stator 118 and stator 118-motor housing 14 connection.

Figure 3:
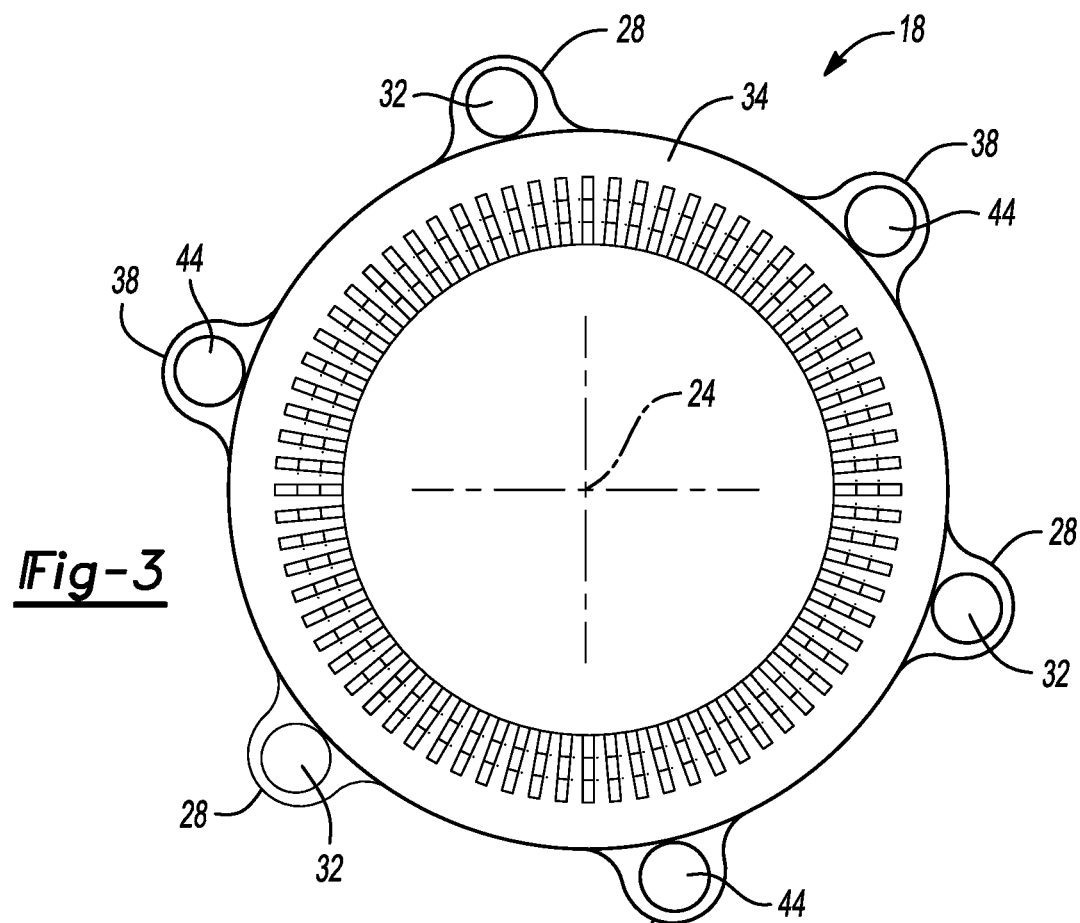
FIG. 3 is a schematic illustration of a top view of the stator of FIGS. 1 and 2.
Figure 6:
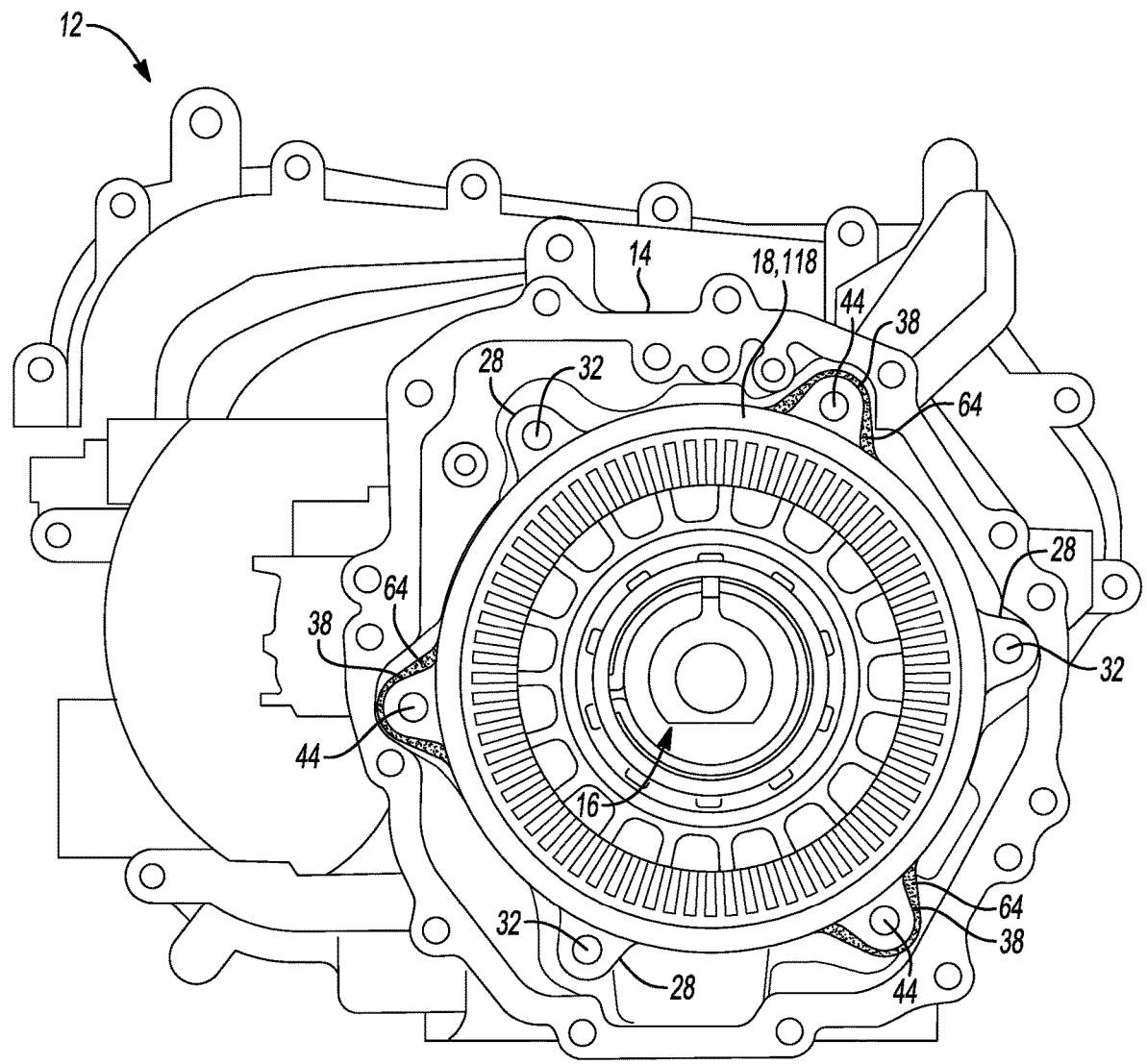
FIG. 6 is a schematic illustration of a top view of the stator of FIGS. 1-3 fastened to the motor housing of FIGS. 1 and 5.

Referring now to FIGS. 1, 3, and 6, the electromagnetic machine 12 also includes the first plurality of fasteners 32 each disposed within a respective one of the first plurality of mounting ears 28 to thereby fasten the first lamination stack 20 to the motor housing 14. In addition, the electromagnetic machine 12 includes the second plurality of fasteners 44 each disposed within a respective one of the second plurality of mounting ears 38 to thereby fasten the second lamination stack 34 to the motor housing 14. In addition to fastening or attaching the stator 18 and the motor housing 14, the first plurality of fasteners 32 and the second plurality of fasteners 44 may also provide additional heat sinks or thermal paths to dissipate thermal energy and cool the stator 18 during operation of the electromagnetic machine 12. Further, in one embodiment described with reference to FIG. 1, each of the second plurality of fasteners 44 may be longer than each of the first plurality of fasteners 32. In another embodiment described with reference to FIG. 6, each of the first plurality of fasteners 32 may have a first length 60 and each of the second plurality of fasteners 44 may have a second length 62 that is equal to the first length 60.

Figure 5:
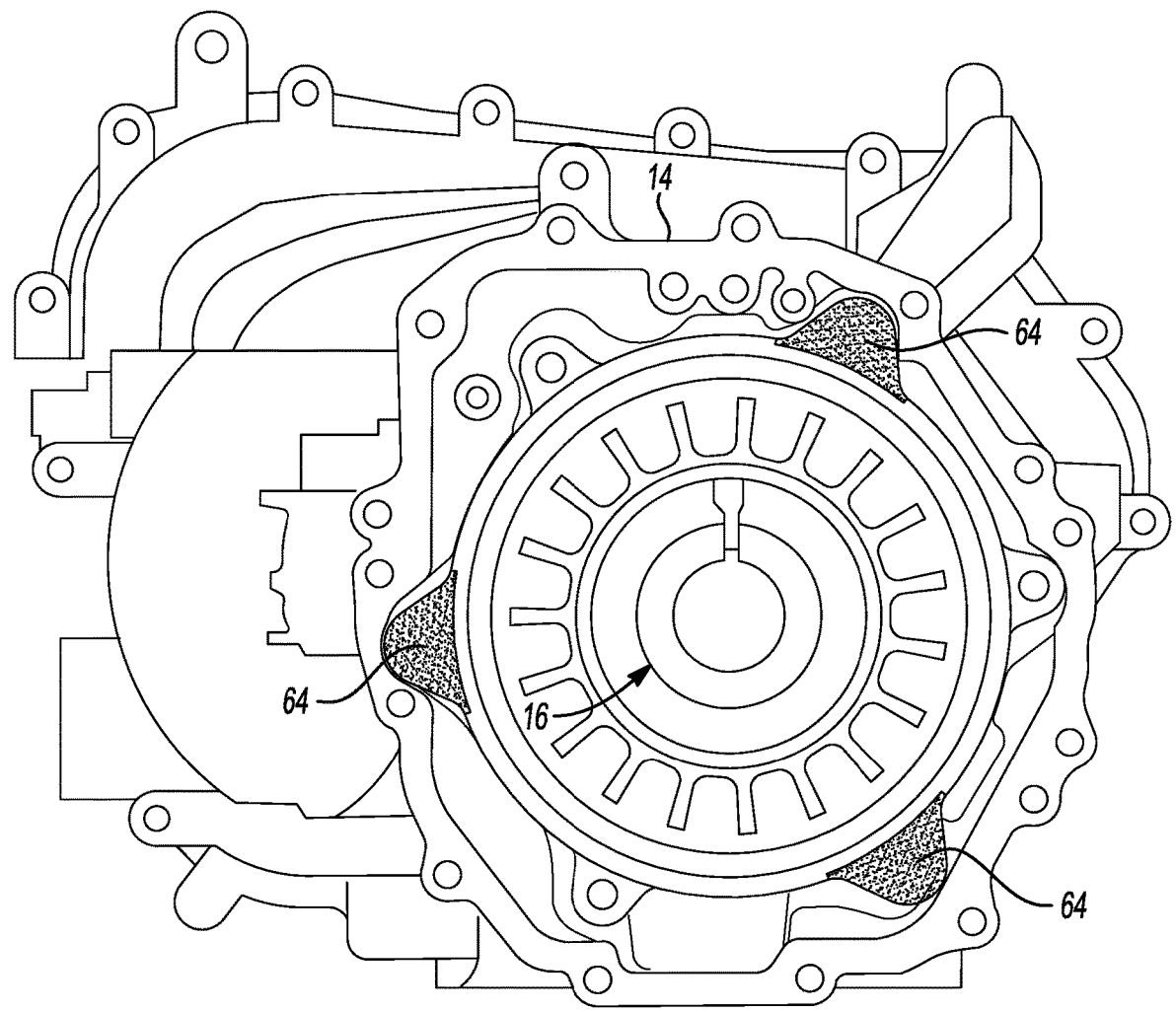
FIG. 5 is a schematic illustration of a top view of the motor housing of FIG. 1.

That is, referring now to FIG. 5, the electromagnetic machine 12 may further include a plurality of bosses 64 disposed on the motor housing 14 and each configured for receiving a respective one of the second plurality of fasteners 44. Each of the plurality of bosses 64 may be a protruding feature formed on or disposed in the motor housing 14. Additionally or alternatively, each of the plurality of bosses 64 may include or be configured as an additional bracket disposed on the motor housing 14.

The plurality of bosses 64 may be configured to locate the second plurality of fasteners 44 within the motor housing 14 and reduce attachment tolerances that may otherwise exist due to different attachment planes for the first plurality of fasteners 32 and the second plurality of fasteners 44. That is, for the embodiment in which each of the second plurality of fasteners 44 has the same length as each of the first plurality of fasteners 32, the electromagnetic machine 12 may include the bosses 64 or inserts to anchor the second plurality of fasteners 44 to the motor housing 14. For this embodiment, the second plurality of fasteners 44 may extend through the second plurality of mounting ears 38 and attach to the bosses 64.

Although not shown, a method of forming the stator 18, 118 may include welding together the first lamination stack 20 and the second lamination stack 34 at the first external surface 30 (FIG. 2) and the second external surface 42 (FIG. 2). That is, the first lamination stack 20 may be stacked adjacent to the second lamination stack 34 in a welding fixture (not shown) and welded at the first external surface 30 and the second external surface 42.

In another embodiment, the method may include adhering together the first lamination stack 20 and the second lamination stack 34, for example with adhesive or a self-bonding lamination steel including a curable coating. Individual laminations of the first lamination stack 20 and the second lamination stack 34 may be stamped, stacked, and cured to adhere the first lamination stack 20 and second lamination stack 34.

In a further embodiment, the method may include first stamping a blank (not shown) within a die (not shown) to form the first lamination stack 20 and first plurality of mounting ears 28. The method may then include rotating the stamped first lamination stack 20 within the die about the central longitudinal axis 24 before again stamping the stamped first lamination stack 20 to thereby form the second lamination stack 34 and second plurality of mounting ears 38.

The method may also include selecting or optimizing at least one of a number or quantity of lamination stacks 20, 34, 48, a number of annular degrees rotation of the second plurality of mounting ears 38 with respect to the first plurality of mounting ears 28 about the central longitudinal axis 24, and a height 26, 40, 52 of the lamination stacks 20, 34, 48 to minimize noise, vibration, and harshness of the stator 18, 118 during operation of the electromagnetic machine 12. Although the method may initially increase assembly time and cost, the rotated second plurality of mounting ears 38 with respect to the first plurality of mounting ears 28 about the central longitudinal axis 24 may increase stability of the stator 18, 118 and decrease vibration, noise, and harshness of the electromagnetic machine 12 during operation.

Referring again to FIG. 1, the device 10 includes a driven component 68 and an output member 66 disposed within the first cavity 22 (FIG. 2) and the second cavity 36 (FIG. 2) and configured for driving the driven component 68. Further, the electromagnetic machine 12 may be coupled to the driven component 68. That is, the electromagnetic machine 12 may provide power to the driven component 68 through the output member 66. For example, for vehicular applications, the driven component 68 may be a driveshaft, a transmission linkage, or a plurality of wheels. Further, the output member 66 may be a rotor (shown generally in FIG. 1) concentric with the stator 18 and disposed within the first cavity 22 and the second cavity 36.

During operation, the rotor or output member 66 may rotate within the first cavity 22 and the second cavity 36 to thereby generate electric current, which may in turn drive the driven component 68. As such, the stator 18 may be concentric with the output member 66 and may not vibrate unnecessarily during operation. That is, the skewed second plurality of mounting ears 38 with respect to the first plurality of mounting ears 28 about the central longitudinal axis 24 may provide the stator 18 with excellent stiffness and dampen vibration, noise, and harshness of the rotating output member 66 and static stator 18 within the motor housing 14. Further, the configuration and spacing of the plurality of mounting ears 28, 38 may increase motor housing 14-to-stator 18 stiffness, increase concentricity of the stator 18, and decrease an airgap (not shown) between the stator 18 and the output member 66. As such, the electromagnetic machine 12 may not exhibit high noise at comparatively low speeds since twisting of the stator 18 and motor housing 14 may be minimized.

Therefore, the device 10 and electromagnetic machine 12 may be useful for applications requiring excellent efficiency and minimal noise, vibration, and harshness during operation. In particular, the electromagnetic machine 12 may have excellent stiffness and therefore may not suffer from low-frequency whine and/or efficiency losses during operation. Further, the electromagnetic machine 12 and device 10 may be economical in terms of manufacturing time and cost and may be scalable to mass production manufacturing operations. That is, rotation or skewing of the mounting ears 28, 38 with respect to one another may multiply the number of mounting ears 28, 38 for attaching the stator 18 to the motor housing 14, which may increase stiffness and decrease noise, vibration, and harshness without adding stator mass or changing a design or configuration of individual laminations.

While the best modes for carrying out the disclosure have been described in detail, those familiar with the art to which this disclosure relates will recognize various alternative designs and embodiments for practicing the disclosure within the scope of the appended claims.

What is claimed is:

1. A stator for an electromagnetic machine, the stator comprising:
   a first lamination stack defining a first cavity therein and having a central longitudinal axis, wherein the first lamination stack includes a first plurality of mounting ears disposed opposite the first cavity and each spaced apart from one another about the central longitudinal axis; and
   a second lamination stack abutting the first lamination stack and defining a second cavity therein aligned with the first cavity along the central longitudinal axis, wherein the second lamination stack includes a second plurality of mounting ears disposed opposite the second cavity and each spaced apart from the first plurality of mounting ears and from one another about the central longitudinal axis.

2. The stator of claim 1, wherein the first lamination stack is rotated with respect to the second lamination stack about the central longitudinal axis.

3. The stator of claim 1, wherein the first plurality of mounting ears do not contact the second plurality of mounting ears.

4. The stator of claim 1, wherein the first plurality of mounting ears are spaced apart from one another by 120 angular degrees.

5. The stator of claim 4, wherein the second plurality of mounting ears are spaced apart from one another by 120 angular degrees and are each spaced apart from a respective one of the first plurality of mounting ears by 60 annular degrees.

6. The stator of claim 1, wherein the first lamination stack has a first height along the central longitudinal axis and the second lamination stack has a second height along the central longitudinal axis that is equal to the first height.

7. The stator of claim 1, wherein the first lamination stack has a first external surface spaced opposite the first cavity and further wherein the first plurality of mounting ears extend from the first external surface away from the first cavity.

8. The stator of claim 7, wherein the first lamination stack is welded to the second lamination stack on the first external surface.

9. The stator of claim 1, wherein the first lamination stack has an interface surface and is adhered to the second lamination stack at the interface surface.

10. The stator of claim 1, wherein each of the first plurality of mounting ears are configured to receive a respective one of a first plurality of fasteners.

11. The stator of claim 10, wherein each of the second plurality of mounting ears are configured to receive a respective one of a second plurality of fasteners that are different from the first plurality of fasteners.

12. The stator of claim 1, wherein the stator includes at least three of the first plurality of mounting ears and at least three of the second plurality of mounting ears.

13. The stator of claim 1, further including a third lamination stack abutting the second lamination stack and defining a third cavity therein aligned with the first cavity and the second cavity about the central longitudinal axis, wherein the third lamination stack includes a third plurality of mounting ears disposed opposite the third cavity and each spaced apart from the second plurality of mounting ears and from one another about the central longitudinal axis.

14. An electromagnetic machine comprising:
a motor housing defining a chamber therein;
a stator disposed within the chamber and fastened to the motor housing, wherein the stator includes:
 a first lamination stack defining a first cavity therein and having a central longitudinal axis, wherein the first lamination stack includes a first plurality of mounting ears disposed opposite the first cavity and each spaced apart from one another about the central longitudinal axis; and
 a second lamination stack abutting the first lamination stack and defining a second cavity therein aligned with the first cavity along the central longitudinal axis, wherein the second lamination stack includes a second plurality of mounting ears disposed opposite the second cavity and each spaced apart from the first plurality of mounting ears and from one another about the central longitudinal axis;
a first plurality of fasteners each disposed within a respective one of the first plurality of mounting ears to thereby fasten the first lamination stack to the motor housing; and
a second plurality of fasteners each disposed within a respective one of the second plurality of mounting ears to thereby fasten the second lamination stack to the motor housing.

15. The electromagnetic machine of claim 14, further including a plurality of bosses disposed on the motor housing and each configured for receiving a respective one of the second plurality of fasteners.

16. The electromagnetic machine of claim 15, wherein each of the first plurality of fasteners has a first length and each of the second plurality of fasteners has a second length that is equal to the first length.

17. The electromagnetic machine of claim 14, wherein each of the second plurality of fasteners is longer than each of the first plurality of fasteners.

18. A device comprising:
a driven component;
an electromagnetic machine coupled to the driven component and including:
 a motor housing defining a chamber therein;
 a stator disposed within the chamber and fastened to the motor housing, wherein the stator includes:
  a first lamination stack defining a first cavity therein and having a central longitudinal axis, wherein the first lamination stack includes a first plurality of mounting ears disposed opposite the first cavity and each spaced apart from one another about the central longitudinal axis; and
  a second lamination stack abutting the first lamination stack and defining a second cavity therein aligned with the first cavity along the central longitudinal axis, wherein the second lamination stack includes a second plurality of mounting ears disposed opposite the second cavity and each spaced apart from the first plurality of mounting ears and from one another about the central longitudinal axis; and
an output member disposed within the first cavity and the second cavity and configured for driving the driven component.

19. The device of claim 18, wherein the first lamination stack is rotated with respect to the second lamination stack about the central longitudinal axis such that the first plurality of mounting ears do not contact the second plurality of mounting ears.

20. The device of claim 18, wherein the stator further includes a third lamination stack abutting the second lamination stack and defining a third cavity therein aligned with the first cavity and the second cavity about the central longitudinal axis; and
wherein the third lamination stack includes a third plurality of mounting ears disposed opposite the third cavity and each spaced apart from the second plurality of mounting ears and from one another such that the third lamination stack is rotated with respect to the second lamination stack about the central longitudinal axis so that the third plurality of mounting ears do not contact the second plurality of mounting ears.

* * * * *